United States Patent
Ballard et al.

[19]

[11] Patent Number: 5,857,101
[45] Date of Patent: Jan. 5, 1999

[54] PROGRAM LUNCH ACCELERATION

[75] Inventors: Clinton L. Ballard, Suquamish; Timothy W. Smith, Seattle; Todd Rogers, Poulsbo, all of Wash.

[73] Assignee: Acceleration Software International Corporation, Poulsbo, Wash.

[21] Appl. No.: 839,742

[22] Filed: Apr. 15, 1997

[51] Int. Cl.[6] .................................................. G06F 9/445
[52] U.S. Cl. ................................................ 395/651; 707/200
[58] Field of Search ...................................... 395/651, 652, 395/653, 704, 710; 707/200, 205

[56] References Cited

U.S. PATENT DOCUMENTS

| | | |
|---|---|---|
| 3,514,762 | 5/1970 | Sloane et al. . |
| 4,052,704 | 10/1977 | Franaszek . |
| 4,511,962 | 4/1985 | Machida et al. . |
| 5,212,786 | 5/1993 | Sathi ........................................ 707/101 |
| 5,428,758 | 6/1995 | Salsburg . |
| 5,442,802 | 8/1995 | Brent et al. . |
| 5,517,316 | 5/1996 | Hube ........................................ 358/296 |

*Primary Examiner*—Dennis M. Butler
*Attorney, Agent, or Firm*—Steven P. Koda

[57] ABSTRACT

A computer program's launch time is reduced by reorganizing physical address storage of the program on a secondary storage device. Launch of the program is detected, then file access during the launch is monitored. A log file entry is created for each access to the secondary storage device. After launch is complete, the portions of the computer program accesses during the launch are moved into a contiguous area of the secondary storage device. Placement within the area corresponds to the access order during launch. Subsequent launches are faster because the launch portions of the program are contiguously located. Only the first access to a given memory block is considered in ordering the portions within the contiguous area The cluster size is used to estimate whether differing log entries correspond to the same address block.

15 Claims, 4 Drawing Sheets

PROGRAM LUNCH ACCELERATION

BACKGROUND OF THE INVENTION

This invention relates to methods and apparatus for optimizing access to a computer program storage device during program start-up, and more particularly to a method for reducing the time to launch a computer program.

A typical computer system includes at least a processing unit, a display device, a primary storage device (e.g., random access memory—RAM), a secondary storage device (e.g., a disk storage device), a keyboard, and a pointing/clicking device. Once a computer program is installed on the computer the program resides on the secondary storage device. The secondary storage device serves as a large permanent memory space. Exemplary secondary storage devices include a hard disk drive, a floppy disk drive, and a compact disk drive. There are many different types of disks, including magnetic disks, magneto-optical disks, optical disks, and floppy disks. To launch a program that is stored on the secondary memory device portions of the program are accessed and moved to the primary storage device. Conventionally, the primary storage device has a smaller address space and is accessed faster than the secondary storage device. Primary storage device memory space is generally treated as a more precious resource than the memory space of the secondary storage device.

A general purpose personal computer typically has many interactive application computer programs installed. A user is able to start-up multiple programs. With regard to an interactive computer program, the term "launch time", as used herein, means the time from when a processor receives a command to start the computer program until the time that the computer program is ready to accept input commands (e.g., user interface commands, batch-entry commands). The term "launch" as used herein means the process performed during the launch time to start up the computer program and get the computer ready to accept input commands for the computer program.

It is common for an application program for a personal computer to be stored in multiple files on the secondary storage device. There often is an executable file, a preferences file and many other files. Some programs include a data base file or a default data file. During a launch of the program multiple files are opened and select portions are moved from the secondary storage device into the primary storage device. When purchasing a computer program the packaging often specifies the amount of RAM address space (i.e., primary storage device address space) required to be allocated to the program while active. By active it is meant that the program has been launched and is currently processing or is currently able to accept input commands.

SUMMARY OF THE INVENTION

According to the invention, launch time for a computer program is reduced by reorganizing physical address storage of the computer program on a secondary storage device, (e.g., disk storage device). The normal launch sequence of the computer program is monitored. The storage of the computer program then is re-arranged to more closely match the access pattern during program launch.

According to one aspect of the invention, computer activity is monitored to determine when a computer program is being launched. For a launch for a program has not yet had its launch time optimized, file access is monitored during the program launch. Such monitoring includes logging file accesses to the secondary storage device occurring during the launch. The cluster address and the time of access are stored in the log.

According to another aspect of the invention, after program launch is complete the launch access log is processed. During a program's launch sequence multiple files are open at a given time. Contents from a first file are accessed, then contents from a second file. As the accesses continue the first file again is accessed. Thus, accesses to the multiple files are interspersed amongst each other. An exemplary sequence might be: File 1 (address 1), File 2 (address 20), File 3 (address 40), File 1 (address 6), File 3 (address 35), File 2 (address (25).

According to another aspect of the invention, the launch access log is processed by identifying all the file portions accessed during the launch, eliminating any duplicate cluster accesses, then moving the accessed file portions in to a common contiguous area of the disk. The organization need not be the order such portions are accessed during the launch sequence.

According to an alternative aspect of the invention, to reduce launch time, the physical storage of the files are fragmented according to the logged access pattern. The smallest accessible address space is for a given operating system is called the minimum file system allocation unit (also referred to as a memory block or cluster). The files for the computer program whose launch time is to be optimized are re-organized. For the example above, the files are fragmented as follows: Cluster having File 1 (address 1), Cluster having File 2 (address 20), Cluster having File 3 (address 40), Cluster having File 1 (address 6), Cluster having File 3 (address 35), Cluster having File 2 (address (25). Each file portion accessed during the launch sequence is stored in a contiguous area of memory. The order within such contiguous area corresponds to the access order listed in the access log. Redundant accesses in the access log to addresses in the same cluster are ignored so as to avoid storing the cluster more than once on the secondary storage device.

According to another aspect of the invention, a subsequent launch of the computer program occurs faster because the most of the launch sequence invokes contiguous access to the secondary storage device. (Non-contiguous accesses may occur for redundant accesses to a physical address cluster).

According to a method of this invention launch time is reduced for a computer program including a plurality of files stored on a secondary storage device. Each one of the plurality of files is stored in a plurality of physical addresses encompassing at least a portion of a physical address block of the secondary storage device, wherein a physical address block is a minimum unit of physical addresses on the secondary storage device copied to a primary storage device. The method includes detecting that a computer is executing a launch sequence for initializing the computer program. During the launch sequence, contents of physical address blocks of the secondary storage device at which portions of the computer program are stored are copied to the primary storage device. Accesses to the secondary storage device during the computer program launch sequence are logged. A log entry is generated in sequence for each access to a physical address block at which a portion of the computer program is stored. The sequence of log entries corresponds to an access order of portions of the computer program. After the launch sequence is complete, a contiguous area of physical addresses is allocated on the secondary storage device large. The contiguous area is large enough to store the contents of the physical address blocks copied to the primary storage device during the launch sequence. Each file on the secondary storage device having a portion of the computer program that was copied to the primary storage device during the launch sequence is fragmented. The portions accessed during the launch sequence are relocated into the contiguous area. The relocated portions are organized to correspond to the order they were first accessed during the launch sequence, as indicated by the sequence of log entries.

According to another aspect of the invention, a subsequent access to a given copied portion of the computer program is identified when an access request in the sequence of log entries specifies a physical address within a prescribed number of addresses from a physical address specified in an earlier access request in the sequence of log entries. The prescribed number of physical addresses equals the number of physical addresses in the minimum file system allocation unit.

According to another aspect of the invention, the contiguous area is a first contiguous area. Average data throughput rate for accessing the first contiguous area of the secondary storage device during a subsequent launch sequence of the computer program is calculated. In addition an average intrinsic data transfer rate for the first contiguous area is calculated. The contents of the first contiguous area are moved to a second contiguous area which has a slower average intrinsic data transfer rate than the first contiguous area when the calculated throughput rate is at least 25% less than the calculated transfer rate. The contents of the first contiguous area are copied to a third contiguous area which has a faster average intrinsic data transfer rate than the first contiguous area when the calculated throughput rate is not more than 20% less than the calculated transfer rate.

According to another aspect of the invention, for multi-process systems, a launch log is generated for each application being launched. Disk accesses are stored in the log of the application requesting the disk access.

These and other aspects and advantages of the invention will be better understood by reference to the following detailed description taken in conjunction with the accompanying drawings.

DESCRIPTION OF SPECIFIC EMBODIMENTS

Overview

Figure 1:
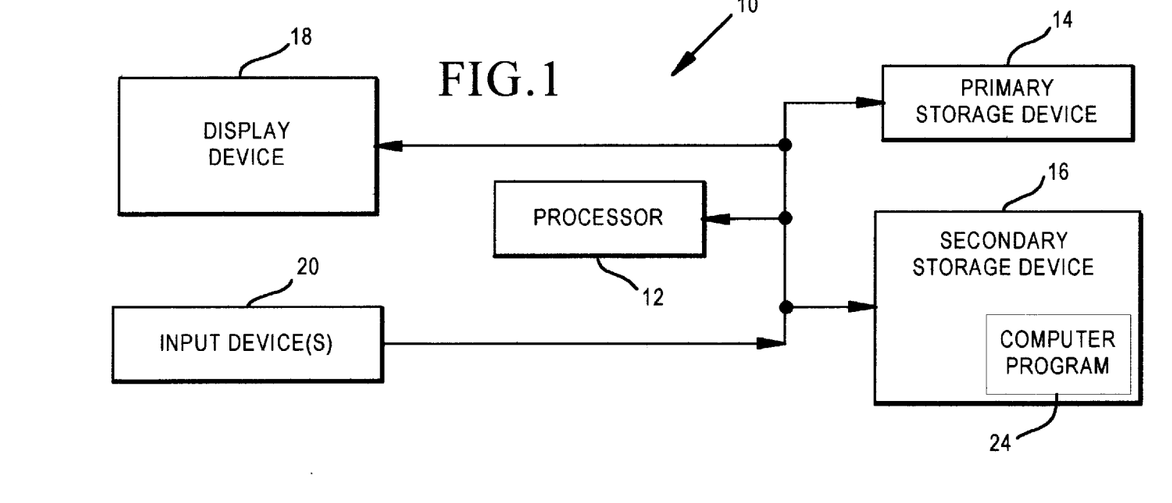
FIG. 1 is a block diagram of a computer system hosting a method embodiment of this invention.

FIG. 1 shows a block diagram of a computer system 10 hosting a method embodiment of this invention. The computer system 10 includes a processor 12, a primary storage device 14, a secondary storage device 16, a display device 18 and one or more input devices 20. In one configuration the computer system is a personal computer, configured in a stand-alone environment or as part of a network. In another configuration the processor 12, primary storage device 14, display device 18 and input devices 20 are part of one computer while the secondary storage device is part of another computer (e.g., server) on a network. In yet another configuration the display 18 and input devices 20 are part of one computer, while the processor, primary storage device and secondary storage device are part of another computer on the network.

The processor 12 serves to execute an operating system and one or more application computer programs. In some embodiments there are multiple processors for executing the operating system and application programs. System utilities and/or operating system extension programs also are executed according to some computer system 10 embodiments. Conventional operating systems include DOS, Windows, Windows NT, Mac O/S, OS/2 and various UNIX-based operating systems. The display device 18 and input devices 20 enable interaction between a user and the computer system 10. The computer system 10 in the process of executing the operating system and zero or more computer programs defines an operating environment for a user to interact with the computer, operating system and executing computer program. The display device 18 serves as an output device. Exemplary display devices include a CRT monitor or flat panel display. The user inputs commands and data to the computer system 10 via the input devices. Exemplary input devices include a keyboard, a pointing device and a clicking device. Data also is input to the computer via transportable disks or through I/O ports (not shown).

The secondary storage device 16 serves as a permanent storage memory for one or more computer programs 24 to be executed by the processor 12. The secondary storage device 16 also stores data files for use with the application computer programs. Exemplary secondary storage devices include a hard disk drive, floppy disk drive, CD-ROM drive, bernoulli disk drive or other drive system for accessing permanent or replaceable disks, such as floppy disks, magnetic disks, magneto-optical disks, or optical disks.

The primary storage device 14 typically is a storage device having a faster access time than that of the secondary storage device. An exemplary primary storage device 14 is random access memory (RAM). Often the RAM serves as a cache. Portions of a computer program and/or data files are loaded into the RAM to speed up execution of the program and processing of data. Mass produced computer software typically include specifications requiring a minimum amount of RAM required to run the program on a given computer system. During a launch sequence for starting such a computer program, portions of the program are copied from the secondary storage device into RAM.

A launch sequence as used herein means the sequence of steps executed by the computer system during the launch time which pertain to starting up a given computer program and getting the computer ready to accept input commands for the computer program. A launch sequence is executed for a computer program. Different computer programs have different launch sequences. Steps included in a launch sequence include copying portions of the computer program being launched from the secondary storage device to the primary storage device. Other steps may include allocating a port or device to serve as an input source and/or output receptor. The method of this invention for accelerating a program launch is directed to improving the speed for accessing the secondary storage device during a launch sequence.

Method for Accelerating Computer Program Launch

Figure 2:
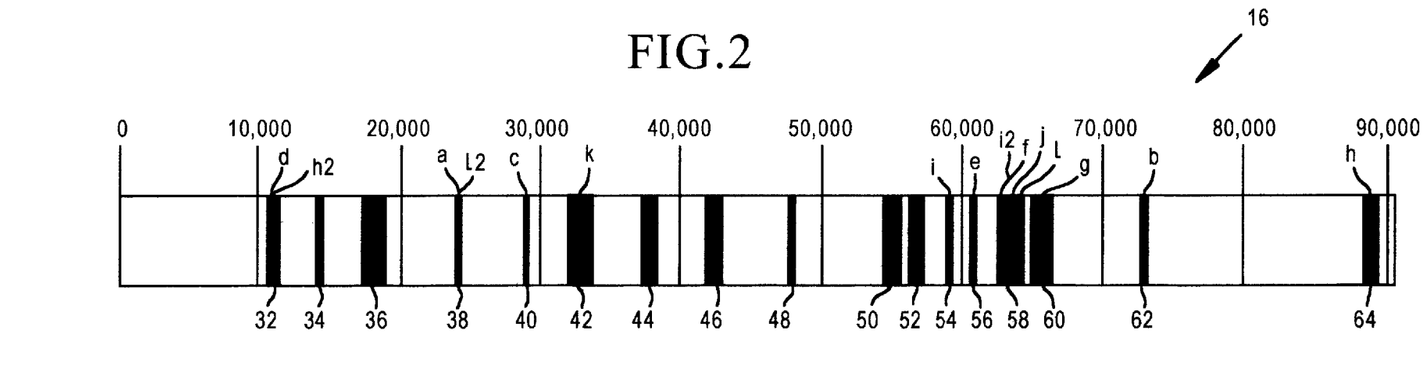
FIG. 2 is a diagram of a portion of the memory address range for the secondary storage device of FIG. 1 showing the storage locations of a given computer program.

FIG. 2 is a diagram of the secondary storage device 16 address space prior to a given computer program's launch sequence is accelerated. The dark regions indicate areas where contents 32–64 of a computer program 24 are stored. The device 16 also stores other computer programs and data. Address space allocation for such other programs and data is not shown. The computer program 24 includes multiple files. The minimum file system allocation unit is the smallest number of physical addresses that can be read or written to the secondary storage device. Such minimum file allocation unit also is referred to as a memory block or address cluster. When a specific address is specified in a READ call, the block encompassing such address is read from the secondary storage device and stored in the primary storage device. When a specific address is specified in a WRITE call, the block encompassing such address is written from the primary storage device into the secondary storage device. Listed below in table A is an exemplary portion of a file allocation table serving as a cross reference of logical addresses and physical addresses for the computer program. Part nos. are added to correlate the table with FIG. 2. The logical addresses typically are generated at the time the computer program is compiled. The physical addresses are the actual addresses on the secondary storage device 16 where the files are stored. Note that the part number is used to refer to a part of the computer program as distinct from the physical addresses at which such part is stored.

TABLE A

| Program File | Logical Address | Physical Address | Part No. |
| --- | --- | --- | --- |
| File 1 | 1–200 | 10010–10200 | 32 |
| File 1 | 210–300 | 24410–24500 | 38 |
| File 1 | 310–500 | 38110–38300 | 44 |
| File 1 | 510–600 | 48810–48900 | 48 |
| File 1 | 610–800 | 55210–55400 | 50 |
| File 1 | 810–900 | 59010–59100 | 54 |
| File 1 | 910–1000 | 72210–72300 | 62 |
| File 2 | 1010–1300 | 32210–32500 | 42 |
| File 2 | 1310–1500 | 42410–42600 | 46 |
| File 2 | 1510–1600 | 61110–61200 | 56 |
| File 2 | 1610–1800 | 64410–64600 | 60 |
| File 2 | 1810–2000 | 89010–89200 | 64 |
| File 3 | 2010–2100 | 14110–14200 | 34 |
| File 3 | 2110–2400 | 18610–18900 | 36 |
| File 3 | 2410–2500 | 29110–29200 | 40 |
| File 3 | 2510–2700 | 56210–56400 | 52 |
| File 3 | 2710–3000 | 63010–63300 | 58 |

Figure 3:
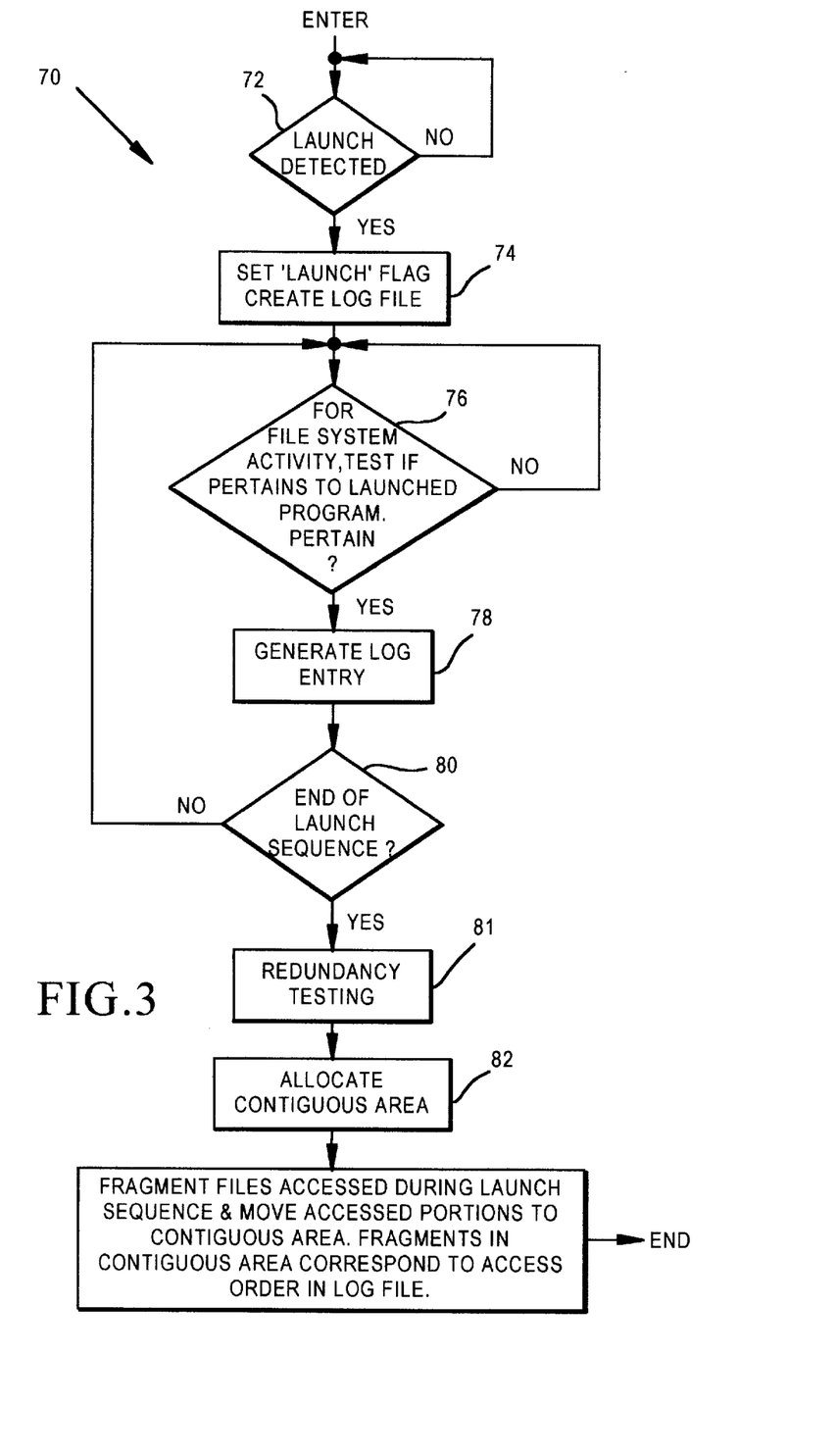
FIG. 3 is a flow chart of a method for reducing access time during a program's launch sequence to achieve an accelerated launch.

FIG. 3 is a flow chart 70 of one embodiment of the method for accelerating a program's launch sequence.

Launch Detection:

The first step 72 in the method is to detect that a computer program is being launched. According to one embodiment an interrupt is generated each time a file is opened. The interrupt service routine in effect hooks into the operating system to determine that a program is being launched. Specifically, the interrupt service routine checks to see if the file is being opened with an "execute" privilege. If so, then such file is an executable file which is to be run. The contents of such file are executable object code instructions to be processed by the processor 12.

The interrupt service routine sets a flag (step 74) indicating that a computer program launch sequence is commencing. The routine also checks with a table storing indicators for programs that already have had the launch optimized. If the current program, as indicated by the file with execute privilege, is not yet optimized, then a log file is opened. The log file corresponds to a specific computer program—the one being launched that triggered such log file to be created. When multiple programs are being launched at the same time, a log file is created for each such program.

Log File System Activity:

Once the launch of a computer program is detected and a log file is opened, all file system activity is monitored (step 76). Specifically, for each operating system call to the file system the call is analyzed to determine to which application being launched, if any, does the call pertain. Exemplary operating system calls to the file system are OPEN, READ, WRITE, and CLOSE. If the call pertains to a computer program being launched, then an entry is appended to the appropriate log file (step 78). The log entry includes a file identifier, the logical address(es) specified in the call and the time of access (e.g., system time; index value). Alternatively, the physical memory address(es) corresponding to the logical address(es) are stored in the log entry. In some embodiments, the operating system has already caused the physical addresses to be generated. If not, then the physical addresses are derived from the logical addresses using the operating system's file allocation table to translate the logical address into the physical address.

A logical address (also referred to as a virtual address) is the address which the computer program uses to access memory. A memory management unit translates this address into a physical address before the actual memory is read or written. A physical address is a memory location on the secondary storage device 16.

Listed below in Table B is a sample launch sequence for computer program 24 exemplified above in Table A:

TABLE B

| Order in Sequence | File | Address Blocks Encompassed |
| --- | --- | --- |
| a | File 1 | 24410–24500 |
| b | File 1 | 72210–72300 |
| c | File 3 | 29110–29200 |
| d | File 1 | 10010–10200 |
| e | File 2 | 61110–61200 |
| f | File 3 | 63010–63100 |
| g | File 2 | 64410–64600 |
| h | File 2 | 89010–89100 |
| i | File 1 | 59010–59100 |
| j | File 3 | 63110–63200 |
| k | File 2 | 32210–32400 |
| l | File 3 | 63210–63300 |

Detect Launch Completion:

At step 80 the launch sequence is monitored to determine when it is complete. Conventional operating systems have a specific function that is called when a program is ready for normal execution. Under the Macintosh operating system, the function "Get Next Event" is called. For a computer program 24 running under such operating system, such function is called by the computer program 24 when the launch sequence is complete. According to one embodiment of this invention, step 80 is implemented by an interrupt service routine which is called whenever a computer program calls such function. The interrupt service routine closes the log file and clears the launch flag.

In an alternative embodiment, access activity to the secondary storage device 16 is monitored to determine when activity has ceased for a threshold length of time (e.g., 3 seconds). Alternatively or in addition activity is monitored to determine when activity has gone below a threshold data throughput rate (e.g., 50 kilobytes per second) for a threshold period of time (e.g., 5 seconds). When there is insufficient activity for such threshold time, then the program launch is considered to be complete. The log file then is closed and the launch flag is cleared.

Re-Organize Launch Files:

Once the launch sequence is determined to have been completed, then the storage of the computer program on the secondary storage device is re-organized. The purpose for re-organizing the storage of the computer program is to improve access to the portions of the computer program accessed during the launch sequence. If access to such portions occurs faster, then the launch time (i.e., time elapsed from start to finish of launch sequence is less) is reduced. Thus, the launch of the computer program is accelerated.

At step 82 the amount of memory accessed during the launch sequence is calculated and an a contiguous area of the secondary storage device 16 is allocated. In the sample launch sequence listed in Table B, the secondary storage device accesses encompass 1280 physical addresses (i.e., 128 blocks of memory). The file system allocation table is scanned to determine where there is enough contiguous space on the secondary storage device 16 to store the file portions accessed during the launch sequence. For the sample launch sequence, it would be determined where there are 128 contiguous memory blocks available. If found then, the contents of the address blocks accessed during the launch sequence, as specified in the log file, are moved to the contiguous area. If not found, and the largest contiguous area is at least 50% of the space needed, then a portion of the launch sequence is moved to the contiguous area. In the case where the contiguous area is at least 50% but less than 100%, the computer program launch time is reduced, although not as much as it would be if the entire launch sequence were stored in the contiguous area.

Figure 4:
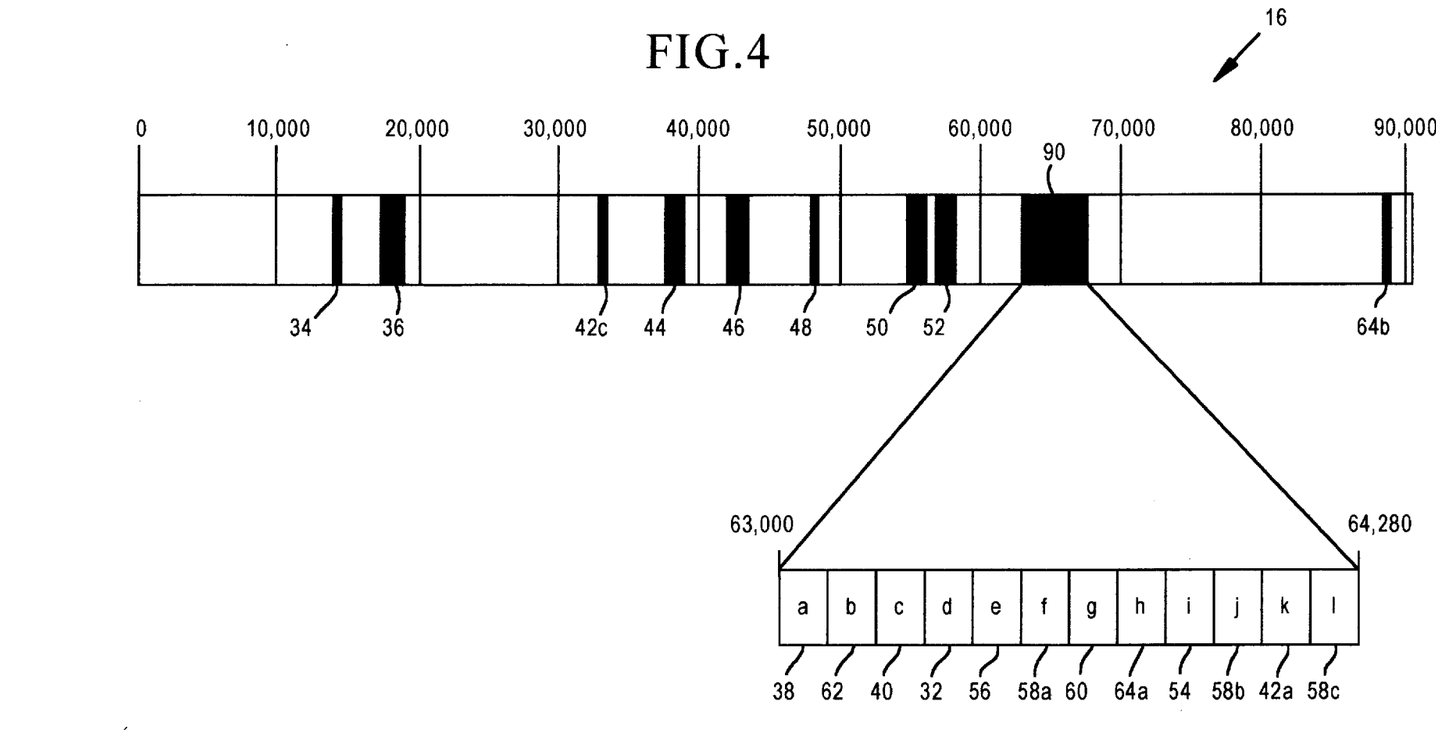
FIG. 4 is a diagram of the secondary storage device address rang of FIG. 2 showing the computer program refragmented to reduce launch time.

To perform the move of the launch sequence portions of the computer program into the contiguous area, the files encompassing such portions of the computer program are fragmented. Specifically, the portions accessed during the launch sequence are stored within the contiguous area. In one embodiment the portions accessed for a given file are stored contiguously. With the launch portions for each file also being contiguous. In another embodiment the order is arbitrary. In a preferred embodiment the portions accessed during the launch sequence are stored in contiguous order within the contiguous area according to the chronological access order. FIG. 4 is a diagram of the secondary storage device address space after the computer program has been refragmented for such preferred embodiment. The computer program portions accessed during the launch sequence are now found in the contiguous area 90 of the secondary storage device 16. An area having the contents the file portions accessed during the computer program launch is also referred to as a launch area for the computer program. The location of the other portions of the computer program is not significant for purposes of accelerating the launch sequence, and thus either remain where they were or are moved elsewhere.

Table 3 below shows a different example for a launch sequence for a computer program 24.

TABLE C

| Entry | File | Physical Address Blocks Encompassed |
|---|---|---|
| a | File 1 | 24410–24500 |
| b | File 1 | 72210–72300 |

TABLE C-continued

| Entry | File | Physical Address Blocks Encompassed |
|---|---|---|
| c | File 3 | 29110–29200 |
| d | File 1 | 10010–10200 |
| e | File 2 | 61110–61200 |
| f | File 3 | 63010–63100 |
| g | File 2 | 64410–64600 |
| h | File 2 | 89010–89100 |
| h2 | File 1 | 10010–10100 |
| i | File 1 | 59010–59100 |
| i2 | File 3 | 63010–63100 |
| j | File 3 | 63110–63200 |
| k | File 2 | 32210–32400 |
| l | File 3 | 63210–63300 |
| l2 | File 1 | 24410–24500 |

Note in this example that the log includes redundant entries. Entry h2 is a subset of entry d. Entry i2 is the same as entry f. Entry 12 is the same as entry a. It is expected that a redundant access request results from a computer program launch sequence access specifying a different address in the same block as previously accessed. In determining the amount of contiguous address space needed for the contiguous area, the first log entries to the redundant address blocks are considered and the later accesses are ignored. Thus, in our Table 3 example, access log entries h2, i2 and l2 are ignored. The log encompasses requests for 155 address blocks occur, but 27 address blocks are specified twice. Thus, only 128 memory blocks are needed to store the portions of the computer program accessed during the launch sequence.

The computer program 24 files accessed during the launch sequence (e.g., files 1, 2 and 3) are fragmented or refragmented. The portions of the computer program 24 files that were accessed during the launch sequence are moved into the contiguous area 90 to define a launch area for the computer program 24. The placement within the contiguous area 90 corresponds to the access order identified in the log file. In determining the placement of accessed file portions, only the first access to a given portion (e.g., in address block units) is considered. For example, the contents within the blocks encompassed by addresses 10010–10100 are accessed twice during the launch sequence, at entry d and at entry h2. In determining the placement of such contents within the launch area only the first entry d is considered. FIG. 4 shows the resulting contiguous area for the launch sequence of Table C. The computer program portions in cluster size units are arranged in the order in which each was accessed during the launch sequence.

In an alternative embodiment, an occurrence in the log file other than the first occurrence of a program portion is used for ordering the blocks within the contiguous area. For example, the last entry could be the one considered in an alternative embodiment. Redundant storage of the computer program portions within the secondary storage device, however, is to be avoided—at least for purposes of fragmenting the files for purposes of accelerating the launch sequence.

Figure 5:
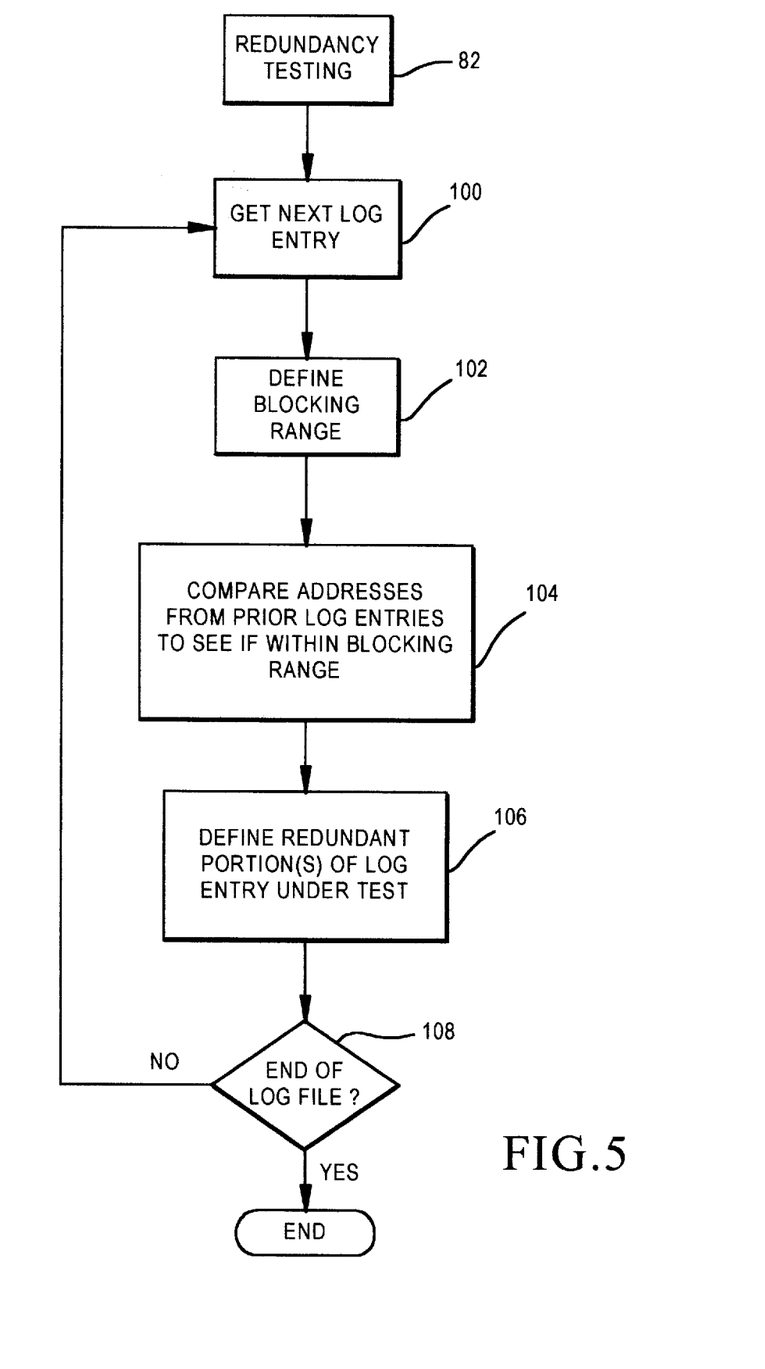
FIG. 5 is a flow chart of steps for determining which portions of a computer program are redundantly accessed during the launch sequence;.

Redundancy Testing:

Frequently the log file will include an entry specifying a single address. Even though only one address is specified, an entire memory block will be accessed (read or written). This is because the minimum file allocation unit is a memory block cluster. Thus, the smallest portion of the computer program than can be accessed is the cluster size (i.e., cluster size). Prior to allocating the contiguous area at step 82, entries in the log file are tested at step 81 to identify any redundant accesses to portions of the computer program. To determine whether a later entry is an access to a redundant portion of the computer program, the cluster address for the access is identified. The cluster address is either stored in the log file or is derived from the address stored in the log file. For a FAT drives the cluster size is stored in the drive's boot sector. The boot sector includes information about the layout of the file system used for the drive partition. Following the boot sector are several reserved sectors. Following the reserved sectors is the file allocation table (FAT). Following the FAT are one or more backup copies of the FAT. Following the backup copies is the root directory. The size of the root directory is specified in the boot sector. After the root directory are the user's file and directory area. This is the area divided into clusters. Thus, from the information in the boot sector the starting address of cluster space is determined, along with the size of a cluster. Thus, the address boundaries for each cluster are known.

The address for any given cluster x is given by Ax+B, where A and B are constants determined from the boot partition. Thus, for any given file system call the cluster boundaries for such address are determinable. The log file stores either the accessed address, the cluster number (i.e., x) or the cluster address (e.g., start address, end address or some other identifying address) for each cluster accessed.

Following is a description of the redundancy testing. Consider the following access sequence: address 139, address 119, address 110, addresses 120–133, and addresses 138–140. Also consider that the memory block and cluster size is 10 addresses, and that blocks are located at 100–109, 110–119, 120–129, 130–139, 140–149. When address 139 is accessed the contents within the block of addresses 130–139 is accessed. For an embodiment which stores a starting address of the cluster as the cluster address, the log entry includes address 130. When address 119 is accessed the contents within the block of addresses 110–119 is accessed. The log entry for such access includes address 110. The next access in the launch sequence specifies address 110, causing the block 110–119 to be accessed. The cluster address is 110 which is already in the log. This access is a redundant access to a cluster already specified. Thus, an additional entry is not made in the log. The next access specifies addresses 120–133. This access spans two clusters 120–129 and 130–139. The accesses are logged separately. First a log entry is made specifying the cluster address 120. Second, it is found that the cluster address 130 for the second part of the access is already specified in the log file. Thus, this cluster has already been accessed. To avoid a redundant entry, the second access to this cluster is not logged. The next access specifies addresses 139–140. This access also spans two clusters. The first cluster accessed is for cluster 130–139. This access is not logged because the cluster is already included in a log entry. The next cluster accessed is cluster 140–149. This is a nonredundant access. Thus, cluster address 140 is included in a log entry. At step 108 it is determined whether the end of the log file has been reached. If reached then the redundancy testing is complete. If not, then the next entry is retrieved (loop to step 100).

When moving the computer program portions accessed during the launch sequence, the contents of the blocks having starting addresses 130, 110, 120 and 140 are moved into the contiguous area. Thus, the contents at addresses 110–149 are moved. The order within the contiguous area is: first, the contents that of addresses 130–139. Second the contents of addresses 110–119. Third, the contents of addresses 120–129. Fourth, the contents of addresses 140–149.

In most instances the redundant accesses are eliminated from consideration by a cache operation performed by the computer. Specifically, when caching is performed the second access to the same cluster will not result in a call to the hard drive because the data is in the cache. The cache will satisfy the request. Requests satisfied by the cache are ignored for purposes of creating a log of accesses. Thus, redundant entries do not get logged.

Subsequent Processing:

Subsequent launches of the computer program 24 after re-arranging the file portions accessed result in the same portion of the computer program being accessed in the same order as the original launch before optimization. When the access requests are handled by the secondary storage device, however, the accesses generally come in the contiguous order of the physical storage of those file portions. The non-contiguous accesses occurs in instances when the log entry for such access was considered to be redundant or partially redundant. The number of non-contiguous accesses is substantially reduced, however, relative to the number occurring during prior launches (i.e., launches prior to optimizing storage of the launch portions of the computer program). Thus, the accesses to the secondary storage device occur faster, reducing the launch time. In some computer systems 12 a cache will take a larger chunk of memory than the access request specifies. In such situation, fewer actual accesses to the secondary storage device occur during such subsequent launch, thereby allowing an even faster launch time.

Additional Acceleration:

According to another aspect of the invention, additional reduction in the launch time is achieved by relocating the launch area to a different contiguous area on the secondary storage device having a faster intrinsic access time. For some launch sequences the specific location of the launch area on the secondary storage device 16 may not make a difference due to the times elapsed between access requests. In other launch sequences, the particular location on the secondary storage device may impact how fast the contents can be accessed in the launch area. For conventional disks having cylinder and track storage structures, access time is intrinsically faster for those cylinders closer to the disk center than for those cylinders toward the periphery of the disk.

During operation of the computer system 12, the number of launches is counted respectively for each computer program which is optimized for launch acceleration. In addition, an actual data throughput rate is estimated for accessing the contiguous launch area at which the launch portions of a given computer program are stored. Also, an intrinsic data transfer rate is calculated for the contiguous area of the secondary storage device where the launch area is located. The actual data throughput rate is estimated by noting the time that an optimized launch sequence commences, the time that the launch sequence completes and the size of the contiguous area storing the launch sequence. An average throughput then is derived as the area size divided by the difference between the end time and the start time. The intrinsic data transfer rate is calculated by performing a sequence of accesses to the contiguous area without intervening delays or events. The intrinsic transfer rate is the area size accessed divided by the difference between the end time and the start time.

Aperiodically, such as during a maintenance session or when commanded by a user, a process is executed to perform such further optimization of the launch acceleration. Specifically, the process tests to determine whether movement of the launch area to another contiguous area on the secondary storage device will further reduce the launch time. If so, the launch area is moved. Applications launched the most are given first priority in relocating.

For a given application, the actual throughput rate calculated for the launch sequence is compared to the intrinsic rate for the area where the launch sequence is stored. If the actual throughput rate is within a first threshold percent of the intrinsic transfer rate, then the launch sequence is a candidate for relocation to a different contiguous area having a faster intrinsic transfer rate. Intrinsic transfer rate for such other areas are determined in the same manner as for the contiguous area storing the launch sequence. Areas located farther from the disk center have a faster intrinsic transfer rate. Data is stored at a common density. However, farther from the disk center the disk has a faster linear velocity than at the disk center. In a specific embodiment, the launch area is a candidate for relocation if the actual throughput rate is no slower than 20% of the intrinsic transfer rate of the same area. In other embodiments the 20% first threshold varies.

In some embodiments the launch area also is tested to determine whether it should be demoted to a contiguous area having a slower intrinsic transfer rate. If the actual throughput rate is not within a second threshold percent of the intrinsic transfer rate, then the launch sequence is a candidate for relocation to a different contiguous area having a faster intrinsic transfer rate. In a specific embodiment, the launch area is a candidate for relocation if the actual throughput rate is no slower than 25% of the intrinsic transfer rate of the same area. In other embodiments the 25% second threshold varies.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A method for reducing launch time for a computer program, wherein the computer program comprises a plurality of files stored on a secondary storage device, each one of the plurality of files stored in a plurality of physical addresses encompassing at least a portion of a physical address block of the secondary storage device, a physical address block being a minimum unit of physical addresses on the secondary storage device copied to a primary storage device, the method comprising the steps of:

detecting that a computer is executing a launch sequence for initializing the computer program, wherein during the launch sequence, contents of physical address blocks of the secondary storage device at which portions of the computer program are stored are copied to the primary storage device;

logging accesses to the secondary storage device during the computer program launch sequence, wherein a log entry is generated in sequence for each access to a physical address block at which a portion of the computer program is stored, and wherein the sequence of log entries corresponds to an access order of portions of the computer program;

detecting that the launch sequence is complete;

allocating a contiguous area of physical addresses on the secondary storage device large enough to store said contents of the physical address blocks copied to the primary storage device during the launch sequence;

fragmenting each file on the secondary storage device having a portion of the computer program that was copied to the primary storage device during the launch sequence to relocate the copied portions into the contiguous area, wherein the relocated portions are organized to correspond to the order said copied portions were first accessed during the launch sequence as indicated by the sequence of log entries.

2. The method of claim 1, wherein a subsequent access to a given copied portion of the computer program is identified when an access request in the sequence of log entries specifies a physical address within a prescribed number of addresses from a physical address specified in an earlier access request in the sequence of log entries, and wherein the prescribed number of physical addresses equals the number of physical addresses in the minimum file system allocation unit.

3. The method of claim 1, wherein the contiguous area is a first contiguous area, and further comprising after the, step of fragmenting, the steps of:

calculating average data throughput rate for accessing the first contiguous area of the secondary storage device during a subsequent launch sequence of the computer program; and calculating an average intrinsic data transfer rate for the first contiguous area.

4. The method of claim 3, in which the calculated throughput rate is at least 25% less than the calculated transfer rate, and further comprising the step of moving the contents of the first contiguous area to a second contiguous area which has a slower average intrinsic data transfer rate than the first contiguous area.

5. The method of claim 3, in which the calculated throughput rate is not more than 20% less than the calculated transfer rate, and further comprising the step of moving the contents of the first contiguous area to a third contiguous area which has a faster average intrinsic data transfer rate than the first contiguous area.

6. A method for reducing respective launch times for each one of a plurality of computer programs, wherein said each one of the computer programs comprises respectively a plurality of files stored on a secondary storage device, each one of the plurality of files stored in a plurality of physical addresses encompassing at least a portion of a physical address block of the secondary storage device, a physical address block being a minimum unit of physical addresses on the secondary storage device copied to a primary storage device, the method comprising for said each one of the plurality of computer programs, the steps of:

detecting that a computer is executing a launch sequence for initializing said one computer program, wherein during the launch sequence, contents of physical address blocks of the secondary storage device at which portions of said one computer program are stored are copied to the primary storage device;

logging accesses to the secondary storage device during said one computer program's launch sequence, wherein a log entry is generated in sequence for each access to a physical address block at which a portion of said one computer program is stored, and wherein the sequence of log entries corresponds to an access order of portions of said one computer program;

detecting that the launch sequence is complete;

allocating a contiguous area of physical addresses on the secondary storage device large enough to store said contents of the physical address blocks copied to the primary storage device during the launch sequence;

fragmenting each file on the secondary storage device having a portion of said one computer program that was copied to the primary storage device during the launch sequence to relocate the copied portions into the contiguous area, wherein the relocated portions are organized to correspond to the order said copied portions were first accessed during the launch sequence as indicated by the sequence of log entries.

7. The method of claim 6, wherein the contiguous area for said one computer program is a first contiguous area, and further comprising for each on of said computer programs after the step of fragmenting, the steps of:

calculating average data throughput rate for accessing the first contiguous area of the secondary storage device during a subsequent launch sequence of said one computer program; and calculating an average intrinsic data transfer rate for the first contiguous area.

8. The method of claim 7, in which for a first one and a second one of said plurality of computer programs the calculated throughput rate is not more than 20% less than the calculated transfer rate, and further comprising for said first one the step of moving the contents of the first one's first contiguous area to a third contiguous area which has a faster average intrinsic data transfer rate than the first one's first contiguous area, and for said second one the step of moving the contents of the second one's first contiguous area to a fourth contiguous area which has a faster average intrinsic data transfer rate than the second one's first contiguous area.

9. The method of claim 8, further comprising for each one of the computer programs the step of counting a number of times said one computer program is launched, and further comprising the step of giving higher priority to the one of the first one and the second one of the plurality of computer programs that has been launched the most, wherein the contiguous area having a faster average intrinsic data transfer rate is selected first for the one computer program having higher priority.

10. A method for reducing launch time for a computer program, wherein the computer program comprises a plurality of files stored on a secondary storage device, each one of the plurality of files stored in a respective plurality of physical addresses, said plurality of physical addresses encompassing at least a portion of a physical address block of the secondary storage device for each one of the plurality of files, a physical address block being a minimum file system allocation unit of physical addresses on the secondary storage device, the method comprising the steps of:

detecting that a computer is executing a launch sequence for starting up the computer program, wherein during the launch sequence, contents of physical address blocks of the secondary storage device at which portions of the computer program are stored are copied to the primary storage device;

during the computer program launch sequence, logging in sequence access requests to the secondary storage device which specify a physical address within a physical address block storing a portion of the computer program, wherein a log entry is generated for each access to a physical address block at which a portion of the computer program is stored;

detecting that the launch sequence is complete;

allocating a contiguous area of physical addresses on the secondary storage device large enough to store contents of each said physical address block at which a portion of the computer program is stored that was accessed during the launch sequence;

moving to the contiguous area said contents of each said physical address block at which each copied portion of the computer program is stored, wherein the step of moving comprises fragmenting the files of the computer program, wherein file fragments of the computer program within the contiguous area together define a sequence of physical address blocks at which the copied portions of the computer program accessed during the launch sequence are stored, and wherein the relative position within the physical address block sequence of each moved portion of the computer program corresponds to the order that said each copied portion was first accessed during the launch sequence as indicated by the sequence of log entries.

11. The method of claim 10, wherein a subsequent access to a given copied portion is identified when an access request in the sequence of log entries specifies a physical address within a prescribed number of addresses from a physical address specified in an earlier access request in the sequence of log entries, and wherein the prescribed number of physical addresses equals the number of physical addresses in the minimum file system allocation unit.

12. An apparatus for reducing launch time for a computer program, comprising a first processor for executing a launch sequence of the computer program;

a primary storage device accessed by the first processor;

a secondary storage device for permanently storing the computer program, wherein the computer program comprises a plurality of files stored on the secondary storage device, each one of the plurality of files stored in a plurality of physical addresses encompassing at least a portion of a physical address block of the secondary storage device, a physical address block being a minimum unit of physical addresses on the secondary storage device copied to a primary storage device;

means for detecting that the first processor is executing a launch sequence for initializing the computer program, wherein during the launch sequence, contents of physical address blocks of the secondary storage device at which portions of the computer program are stored are copied to the primary storage device;

means for logging accesses to the secondary storage device during the computer program launch sequence, wherein a log entry is generated in sequence for each access to a physical address block at which a portion of the computer program is stored, and wherein the sequence of log entries corresponds to an access order of portions of the computer program;

means for detecting that the launch sequence is complete;

means for allocating a contiguous area of physical addresses on the secondary storage device large enough to store said contents of the physical address blocks copied to the primary storage device during the launch sequence;

means for fragmenting each file on the secondary storage device having a portion of the computer program that was copied to the primary storage device during the launch sequence to relocate the copied portions into the contiguous area, wherein the relocated portions are organized to correspond to the order said copied portions were first accessed during the launch sequence as indicated by the sequence of log entries.

13. The apparatus of claim 12, wherein a subsequent access to a given copied portion of the computer program is identified when an access request in the sequence of log entries specifies a physical address within a prescribed number of addresses from a physical address specified in an earlier access request in the sequence of log entries, and wherein the prescribed number of physical addresses equals the number of physical addresses in the minimum file system allocation unit.

14. The apparatus of claim 12, wherein the contiguous area is a first contiguous area, and further comprising:

means for calculating average data throughput rate for accessing the first contiguous area of the secondary storage device during a subsequent launch sequence of the computer program; and means for calculating an average intrinsic data transfer rate for the first contiguous area.

15. The apparatus of claim 14, further comprising:

means for moving the contents of the first contiguous area to a second contiguous area which has a slower average intrinsic data transfer rate than the first contiguous area when the calculated throughput rate is at least 25% less than the calculated transfer rate; and means for moving the contents of the first contiguous area to a third contiguous area which has a faster average intrinsic data transfer rate than the first contiguous area when the calculated throughput rate is not more than 20% less than the calculated transfer rate.

* * * * *

UNITED STATES PATENT AND TRADEMARK OFFICE
CERTIFICATE OF CORRECTION

PATENT NO. : 5,857,101
DATED      : January 5, 1999
INVENTOR(S) : Ballard et al.

It is certified that error appears in the above-identified patent and that said Letters Patent is hereby corrected as shown below:

On the title page, item [54] and Col.1, line 1,:

Please change the title from "Program Lunch Acceleration" to -- PROGRAM LAUNCH ACCELERATION --

Signed and Sealed this

Twentieth Day of July, 1999

Attest:

Q. TODD DICKINSON

*Attesting Officer*          *Acting Commissioner of Patents and Trademarks*